United States Patent [19]
Robinson et al.

[11] Patent Number: 4,983,698
[45] Date of Patent: Jan. 8, 1991

[54] CATIONIC POLYMERS

[75] Inventors: Peter M. Robinson, Columbus; Nguyen Van-Det, Midland, both of Ga.

[73] Assignee: Exxon Chemical Patents Inc., Linden, N.J.

[21] Appl. No.: 277,715

[22] Filed: Nov. 30, 1988

Related U.S. Application Data

[63] Continuation-in-part of Ser. No. 137,073, Dec. 23, 1987, abandoned.

[51] Int. Cl.$^5$ .............................. C08F 2/32; C08F 2/16
[52] U.S. Cl. ...................................... 526/207; 526/211; 526/212; 526/215; 526/287; 526/292.2
[58] Field of Search ................ 526/211, 212, 206, 207

[56] References Cited

U.S. PATENT DOCUMENTS

| | | | |
|---|---|---|---|
| 3,901,857 | 8/1975 | Sackman | 526/292.2 |
| 3,970,604 | 7/1976 | Wentworth | 526/68 |
| 4,158,726 | 6/1979 | Kamada | 526/292.2 |
| 4,164,612 | 8/1979 | Suzuki | 526/292.2 |
| 4,190,717 | 2/1980 | Suzuki | 526/62 |
| 4,192,797 | 3/1980 | Lederer | 526/70 |
| 4,581,402 | 4/1986 | Dunk | 524/317 |
| 4,668,747 | 5/1987 | Cadel | 526/216 |

Primary Examiner—Christopher Henderson

[57] ABSTRACT

An improved cationic water-soluble polymer is prepared from acrylamide, a cationic monomer such as dimethylaminoethyl methacrylate dimethylsulfate quaternary, and a waste stream which is produced as a result of the transesterification reaction between dialkylamino alcohols and acrylates which is used to prepare the cationic monomer. The polymers are especially useful in dewatering applications.

26 Claims, No Drawings

CATIONIC POLYMERS

This application is a continuation-in-part of U.S. Ser. No. 137,073 filed Dec. 23, 1987, now abandoned.

BACKGROUND OF THE INVENTION

This invention relates generally to a process for preparing water-soluble cationic polymers from non-ionic acrylamide monomers, dialkylaminoalkyl acrylate quaternary cationic monomers, and a waste stream which is produced as a result of the transesterification reaction used to produce the cationic monomer. More particularly, the present invention relates to the use of an azeotropic waste stream which is generated and removed during the transesterification reaction between a dialkylamino alcohol and an acrylate, which is the primary step in the preparation of the cationic monomers.

Cationic water-soluble polymers containing dialkylaminoalkyl acrylate quaternaries are well-known. Such polymers have found a wide variety of uses, for example as flocculants in the mining and paper industries and especially in sewage treatment for sludge dewatering. In view of the large quantities of these polymers used in each of these applications, there is a continuing need to develop more efficient polymer compositions and methods of preparing them.

Furthermore, the use of both the quaternized and unquaternized compounds in other applications, i.e. paints, textiles, and sizes, is growing rapidly. As such, the amount of azeotropic waste stream being produced is increasing and there is an increasing need to develop uses for it. The present invention, which resulted from research to develop improved cationic polymers, provides a new and valuable commercial use for the waste stream.

The present invention is based upon replacing a portion of the non-ionic acrylamide content of a cationic polymer with a waste stream which has been azeotropically stripped off during and after a transesterification reaction which has been used to prepare the cationic monomer. The cationic monomers useful in the present invention and from which the waste stream is produced include those of the formula:

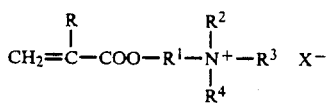

wherein R is hydrogen or methyl, $R^1$ is lower alkylene, and $R^2$, $R^3$, and $R^4$ are each lower alkyl groups as defined further below. These monomers are conventionally prepared by a transesterification reaction between an excess of a lower acrylate or methacrylate of the formula:

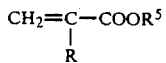

wherein $R^5$ is lower alkyl, and a dialkylamino alcohol of the formula:

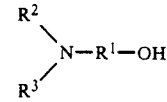

in the presence of catalysts such as metal alkyls, metal alkoxides or organic quaternaries, followed by a quaternization reaction with such as methyl chloride or dimethyl sulfate. Some recent patents related to improving the transesterification process include U.S. Pat. Nos. 3,784,566, 4,074,062, 4,202,990, 4,281,175, 4,301,297, and 4,543,422. In the reaction, the alcohol $R^5OH$ is formed as a byproduct and it is removed, along with excess starting acrylate or methacrylate and substantial amounts of unquaternized dialkylaminoalkyl acrylate, trace amounts of acrylic or methacrylic acid, and some dialkylamino alcohol starting material, generally as an azeotrope by vacuum distillation and generally in the presence of polymerization retarders/inhibitors. Some recent disclosures relating to the distillation include such as U.S. Pat. Nos. 3,959,358 and 4,369,097. This distillation is generally performed at high efficiency and with a high reflux ratio, i.e. 2 to 10 or more. The only present uses for the azeotropic waste stream are either (i) to separate out the $R^5$ alcohol by a further distillation to recover a stream containing about 90% methyl acrylate or methacrylate which can then be recycled in small amounts (along with other associated by-products, i.e. the other 10%) into subsequent transesterfication reactions or (ii) to burn the stream for its fuel value. Waste stream recycling is normally kept to a minimum in order to avoid a build-up of adverse by-products.

To complete the preparation of the cationic monomer, the transesterified material is then quaternized with such as methyl chloride or dimethyl sulfate, generally in the presence of solvents, such as water or ketones, and/or catalysts. Some recent patents directed to the quaternization reaction include U.S. Pat. Nos. 3,948,979, 4,169,208, 4,180,519, 4,362,890 and 4,520,210. The quaternized cationic monomer is then cleaned up to produce the very high purity monomer which is needed for polymerizations. Some recent patents dealing with post-treatment purifications include U.S. Pat. No. 4,614,827 and Jap. Kokai Patent No. SHO 60 (1985)–48955.

The presently commercially utilized cationic monomers have a purity of at least 99.5 percent though generally the purity is 99.8 percent or higher.

It is thus apparent that although the art is aware that cationic monomers must be highly pure to be reproducibly polymerized and, therefore, expensive and time-consuming purification steps are needed in preparing the cationic monomers, there has been no attempt heretofore to develop a practical use for either of the primary waste streams which result from the purification steps.

It is accordingly an object of the present invention to incorporate, into a polymerizable mixture, a minor amount of a waste stream which is produced by azeotropic stripping during and after a transesterification cationic-monomer-forming reaction, to produce water-soluble cationic polymers having substantially lower raw material costs but at least equivalent polymerization and performance profiles to conventionally prepared polymers.

It is a further object to utilize the azeotropic waste stream in water-in-oil emulsion polymerizations to produce particles of water-soluble polymers which, when used in dewatering-type applications exhibit superior performance.

These and other objects will become apparent from the following detailed description of the invention.

SUMMARY OF THE INVENTION

It has been discovered that a water-soluble cationic copolymer useful as a flocculant may be prepared from (i) a nonionic monomer selected from acrylamide and methacrylamide, (ii) a cationic monomer of the formula

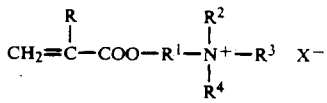

wherein R is hydrogen or methyl, $R^1$ is alkylene $C_2$-$C_4$, $R^2$-$R^4$ are each individually alkyl $C_1$-$C_4$, and X is a counterion, wherein the cationic monomer is prepared by a transesterification reaction between an acrylate of the formula:

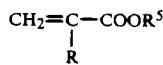

wherein $R^5$ is alkyl $C_1$-$C_3$, and a dialkylamino alcohol of the formula:

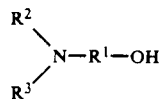

followed by a quaternization reaction, and (iii) an alcohol-based azeotropic waste stream which is generated as a result of the transesterification reaction which produces the cationic monomer.

Preferably, the cationic polymer is prepared in the aqueous phase of a conventional water-in-oil emulsion, and more preferably a bi-phase catalyst system as described below is utilized therein.

DESCRIPTION OF THE PREFERRED EMBODIMENTS

The water-soluble cationic polymers produced by the present invention are comprised of (i) a nonionic monomer selected from acrylamide and methacrylamide, (ii) a cationic monomer of the formula:

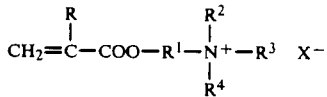

wherein $R$-$R^4$ and X are as defined above, and (iii) an azeotropic waste stream which is produced during a transesterification reaction used to produce the cationic monomer.

The cationic monomers are prepared by conventional two-step reactions of transesterification followed by quaternization. The transesterification reaction, as is well-known, yields a product which is generally about 50 to 75 percent pure depending upon the type of esterification catalyst used and the amount of waste alcohol-acrylate azeotrope which is removed during the course of and after the reaction. The material with the azeotrope removed is then utilized for the quaternization generally after a further distillation to raise the purity to about 85 to 95 percent, and most preferably to 99+percent. Upon completing the quaternization reaction, conventional further clean-up and optional post-treatment(s) are conducted to remove any quaternization solvent or catalyst as well as any undesirable impurities which may have formed or been carried along with the original starting materials. Further details regarding the transesterification and quaternization reactions as well as the azeotropic strip and distillations may be found in the literature since the present invention is independent thereof.

Preferable cationic monomers are those wherein R is H or $CH_3$, $R^1$ is alkylene $C_2$-$C_3$, $R^2$-$R^4$ are individually methyl or ethyl, and X is a counterion. Most preferably, R is H or $CH_3$, $R^1$ is ethylene, and $R^2$-$R^4$ are methyl. Specific cationic monomers useful herein include the quaternaries of dimethylaminoethyl acrylate (DMAEA), dimethylaminoethyl methacrylate (DMAEMA), diethylaminoethyl methacrylate (DEAEMA), and diethylaminoethyl acrylate (DEAEA). Preferably, either methyl chloride or dimethyl sulfate is used as the quaternizing agent.

The third component of the polymerizable mixture is the azeotropic waste stream which is produced in the conventional preparation of the cationic monomers described above. This waste stream generally comprises about 15 to about 35, preferably about 20 to about 30, weight percent $R^4OH$ (usually methanol), about 35 to about 65, preferably about 45 to about 60, weight percent acrylate starting material (usually either methyl acrylate or methylmethacrylate), about 3 to about 20, preferably about 8 to about 15, weight percent dialkylamino acrylate (usually dimethylaminoethyl acrylate or dimethylaminoethyl methacrylate), about 0.1 to about 10, preferably about 0.2 to about 5, weight percent acrylic acid (usually acrylic acid or methacrylic acid), and about 0.5 to about 10, preferably about 1 to about 3, weight percent dialkylamino alcohol starting material (usually dimethylaminoethanol). The azeotrope often also contains up to about 5, preferably about 1 to about 4, weight percent of other compounds which were present or were formed during the transesterification reaction such as volatile polymerization inhibitors/retarders, solvents, and side products derived from minor impurities originally present in the starting materials. Thus, the azeotropic component contains a melange of chemicals, some of which are monomers that will readily enter into the polymerization, some of which are known chain transfer agents that would be expected to adversely affect the molecular weight and thus the performance of the resultant polymer, and some of which would be expected to retard or even inhibit the polymerization.

The azeotrope is normally removed continuously during the transesterification reaction and thus its specific composition varies depending not only upon the starting materials and the reflux conditions, but also upon whether it is an early or late cut or, more usually, a mixture thereof. Alternatively, a major portion of the azeotrope which is present in the reaction mixture may be allowed to remain there during the quaternization reaction and in this manner be incorporated into the polymerizable mixture, rather than having it actually removed as an azeotrope and then incorporated in the polymerizable mixture. Irrespective, the azeotrope (or its chemical equivalent) may be used in the present invention. Preferably the azeotrope will have been produced from the same cationic monomer as will be used in the polymerization, but this has not been found to be critical.

To be able to reproducibly use the azeotropic waste stream from the preparation of such cationic monomers in water-in-oil emulsion polymerizations, it is advantageous to utilize a bi-phase initiator system which comprises either (i) an oil-soluble initiator and a water-soluble initiator, or (ii) an oil-soluble initiator and a water-soluble activator, or (iii) a water-soluble initiator and an oil-soluble activator. Further details on the bi-phase initiator system are disclosed in U.S. Ser. No. 932,542, filed Nov. 18, 1986, now U.S. Pat. No. 4,739,008 the disclosure of which is specifically incorporated herein by reference. This bi-phase initiator system promotes smooth conversion profiles, generating linear high molecular weight polymer in high yields.

Also advantageous to the use of the azeotropic waste stream in a water-in-oil emulsion polymerization is increasing the extent of homogenization during the formation of the initial emulsion to enhance the stability of the emulsion, to generate reproducible initiation/propagation properties of the formulation, and to obtain better heat transfer during the subsequent polymerization. Thus high efficiency homogenizers such as those produced by Tekmar-Dispax, Ross, and Silverson may be used. Other mechanical means of increasing the homogenization, such as ultrasonic sound techniques, may also be used.

It is also advantageous to the present invention to incorporate chemical buffers to control the pH of the polymerization. If the polymerization is performed completely under isothermal conditions, then the pH control of chemical buffers is merely desirable. In the case when the polymerization is performed under adiabatic conditions, where temperature gradients from 0° C. to greater than 90° C. are typical, the use of careful pH control serves to minimize undesirable side reactions, i.e. degradation of polymer molecular weight, degradation and hydrolysis of the cationic moiety, and formation of nonlinear polymer.

To be able to reproducibly utilize the azeotropic waste stream in conventional solution, dispersion, suspension or gel polymerizations from which dry polymers can be isolated, it may also be necessary, depending upon the specific composition of the waste stream and the polymer solids in the polymerization, to add a small amount of a lower alcohol, such as methanol or ethanol, to assist in the solubilization of some of the components of the waste stream in the aqueous monomer phase.

Preferably, the azeotropic waste stream will be used in a water-in-oil emulsion polymerization. Although the present invention has been found to be independent of the particular emulsion polymerization method employed, certain preferences are delineated in the general description of emulsion preparation which follows.

A preliminary emulsion is made by homogenizing oil and aqueous phases. The oil phase of the emulsion, which generally comprises from about 5 to 35 percent by weight of the total emulsion, is comprised of one or more inert hydrophobic liquids. Preferably, the oil phase comprises about 20 to 30 percent of the emulsion.

The oil used may be selected from a large class of organic liquids which are immiscible with water, including liquid hydrocarbons and substituted liquid hydrocarbons. Representative examples of such oils include benzene, xylene, toluene, mineral oils, kerosenes, naphthas, chlorinated hydrocarbons, such as perchloroethylene, and the like.

The oil phase also contains the primary surfactants, i.e., conventional emulsion polymerization stabilizers. Such stabilizers are well known to the art to promote the formation and stabilization of water-in-oil emulsions. Normally such emulsifiers have HLB values in the range of about 2 to about 10, preferably less than about 7. Suitable such emulsifiers include the sorbitan esters, phthalic esters, fatty acid glycerides, glycerine esters, alkanolamides as well as the ethoxylated and/or hydrogenated versions of the above and any other well known relatively low HLB emulsifier. Examples of such compounds include sorbitan monooleate, the reaction product of oleic acid with isopropanolamide, hexadecyl sodium phthalate, decyl sodium phthalate, sorbitan stearate, ricinoleic acid, hydrogenated ricinoleic acid, 9lyceride monoester of lauric acid, glyceride monoester of stearic acid, glycerol diester of oleic acid, glycerol triester of 12-hydroxystearic acid, glycerol triester of ricinoleic acid, and the ethoxylated and/or hydrogenated versions thereof containing 1 to 10 moles of ethylene oxide per mole of the basic emulsifier. Thus any emulsifier may be utilized which will permit the formation of the initial emulsion and stabilize the emulsion during the polymerization reaction.

These primary surfactants are used alone or in mixtures and are utilized in as low amounts as is possible since an excess will not only increase the cost of the resultant emulsion but may also reduce the performance. As such, all of the primary surfactants should together be used in amounts not greater than 3% of weight of the total emulsion. Preferably the amount is not greater than 2%.

The aqueous phase generally comprises about 95 to 65 percent by weight of the emulsion. Preferably, it comprises about 80 to 70 percent thereof. In addition to water, the aqueous phase will contain the acrylamide or methacrylamide, the cationic monomer, and the azeotropic waste stream. Generally the monomers and the waste stream will be present in an amount of less than about 50 percent, preferably about 20 to 40 percent, by weight of the total emulsion. Generally chain transfer agents and sequestrants will be in the aqueous phase before emulsion formation, but they also may be added to the system after the preliminary emulsion has been prepared.

Any monomers which, when copolymerized with the cationic monomer and the acrylamide or methacrylamide, will yield water-soluble polymers may also be incorporated in the present copolymers. The term "water-soluble" means that the polymer is soluble in water in an amount of at least 1% by weight. Examples of other monomers incorporatable herein include acrylic acid and its salts, diacetone acrylamide, methacrylic acid and its salts, maleic acid and its salts, methyl acrylate, ethyl acrylate, propyl acrylate, methyl methacrylate, ethyl methacrylate, vinyl acetate, hydroxyethyl acrylate, hydroxyethyl methacrylate, styrene, acrylonitrile, 2-acrylamido-2-methylpropane sulfonic or phosphonic acids and their salts, 3-(methacrylamido)propyltrimethylammonium chloride, dimethylaminopropylmethacrylamide, isopropylaminopropylmethacrylamide, methacrylamidopropylhydroxyethyldimethylammonium acetate, vinyl methyl ether, vinyl ethyl ether, alkali metal and ammonium salts of vinyl sulfonic acid, vinyl pyridine, vinyl pyrrolidone, vinyl imidazole, diallyldimethylammonium chloride, diallyldiethylammonium chloride, styrene sulfonic acid and its salts, and the like.

The polymers produced by the present invention will generally be prepared from mixtures which comprise about 5 to about 80 weight percent acrylamide or methacrylamide, about 10 to about 85 weight percent cationic monomer, and about 5 to about 40 weight percent azeotropic waste stream. The waste stream may be used as a direct replacement for up to about 75 weight percent of the acrylamide or methacrylamide used in conventional water-soluble cationic polymers with no substantial loss of properties and, in fact, for some uses improved properties. Also, up to about 50 weight percent of the acrylamide or methacrylamide may be replaced by one or more of the other monomers specified above, provided that the acrylamide or methacrylamide content is still at least about 5 weight percent. Preferably, the polymerizable mixture comprises about 5 to about 50 weight percent acrylamide, about 40 to about 80 weight percent cationic monomer, and about 10 to about 35 weight percent azeotropic waste stream. Most preferably, the polymers will be comprised of acrylamide, either the methyl chloride or dimethyl sulfate quaternary of either dimethylaminoethyl methacrylate or dimethylaminoethyl acrylate, and their associated azeotropic waste stream(s).

Any conventional chain transfer agent may be employed, such as propylene glycol, isopropanol, 2-mercaptoethanol, sodium hypophosphite, dodecyl mercaptan and thioglycolic acid. The chain transfer agent will generally be present in an amount of about 0.1 to 10 percent by weight of the total emulsion, though more or less may be used.

Any conventional sequestrant may also be present in the aqueous phase, such as ethylenediaminetetraacetic acid or pentasodium diethylenetriamine pentaacetate or aminomethylene phosphonic acids. The sequestrant is generally present in an amount of about 0.01 to 2 percent by weight of the total emulsion, though more may be used.

Following preparation of the preliminary emulsion, polymerization of the monomers is commenced at a temperature sufficiently high to break down the initiators to produce the desired free radicals. Generally a suitable temperature is about $-20°$ C. to about $200°$ C., with a preferred temperature of about $0°$ C. to $100°$ C.

The polymerization is generally run at a pH of about 2 to about 12, preferably about 3.5 to 5.5 and most preferably about 4.0 to 5.0, and a suitable amount of base or acid or water soluble buffer solution may be added to the preliminary emulsion to achieve the desired pH. A succinic acid/borax buffer maintains a pH of 3.6 to 5.8, depending on the ratio. A sodium acetate/acetic acid buffer maintains a pH of 4.2 to 4.6, depending upon the ratio. The polymerization is usually completed in from about an hour or two to several days, depending upon the monomers employed and other reaction variables. It is generally carried out at atmospheric pressure, but higher pressures are advantageously used when volatile ingredients are involved.

After completion of the polymerization, the pH of the emulsion may be adjusted as desired. For cationic polymeric emulsions this is generally to about 2 to about 7.

A breaker surfactant may then be added to yield a single package final product. Any suitable breaker surfactant may be employed, experimentation being the best means of determining which breaker surfactant will perform optimally with a given emulsion system. Typical breaker surfactants include those having relatively high HLB numbers such as ethoxylated octyl and nonyl phenols, ethoxylated nonyl phenol formaldehyde resin, polyethylene oxide esters of fatty acids, dioctyl esters of sodium sulfosuccinate and others disclosed in U.S. Pat. No. 3,624,019 incorporated herein by reference. Typically, the breaker surfactant is added in an amount equal to about 0.5 to about 6 percent by weight, based on the total emulsion. Preferably the amount is less than about 3 percent, most preferably less than about 2.5 percent.

Once prepared, the emulsions of the present invention may be chemically modified in any known manner. "Chemically modified" is intended to cover further treatment of the dispersed water-soluble polymer and/or the addition of components to the dispersed water-soluble polymer which, without the stabilization provided by the emulsion stabilizers, would cause the normally water-soluble polymeric particles to coagulate or agglomerate. Examples of such further treatments are disclosed in e.g. U.S. Pat. Nos. 4,052,353 and 4,171,296, incorporated herein by reference. The emulsion of the present invention may also be concentrated in any suitable manner, such as is disclosed in U.S. Pat. No. 4,021,399, incorporated herein by reference.

The following examples are illustrative of the present invention, but are not in any way intended to be a limitation thereof. All parts and percents are by weight unless otherwise specified.

EXAMPLE I

Preparation of Azeotropic Waste Stream

To a 500 ml flask is added 200 g methyl methacrylate, 70.0 g of dimethylaminoethanol, 3.15 g of phenothiazine, and 2.85 g of a tin alkyl catalyst. The pot temperature is allowed to reach about 70o C. and the reaction continues under reflux for approx. 1 to 2 hours. Analysis of the contents shows a dimethylaminoethyl methacrylate (DMAEMA) content of about 50%. To enable the reaction to reach completion, the majority of the methyl methacrylate/methanol azeotrope is distilled off over about hours at atmospheric pressure and a temperature of about 60–70° C. The distillation is continued under reduced pressure to obtain DMAEMA having a purity of at least about 99.5% and suitable for quaternization. Distillation fractions not achieving this purity are recycled into the azeotropic waste stream. The azeotropically removed waste stream is found to contain a total of about 130 grams of a mixture consisting of about 18.6% methanol, 65.0% methylmethacrylate, 12.2% DMAEMA, 0.5% methacrylic acid, 1.5% dimethylaminoethanol, and 2.2% of other compounds.

EXAMPLE II

Preparation of Cationic Polymer with Waste Stream

A water phase containing 216 g of a 50% acrylamide solution, 212 g of a dimethylaminoethyl methacrylate methyl chloride quaternary (75% aqueous DMAEMA-MeCl), 50 g of azeotropic waste stream of Example I, 0.3 g ethylenediaminetetraacetic acid, 0.2 g potassium bromate, and 40.0 g water is homogenized in a high efficiency homogenizer with an oil phase containing 305.0 g of Exxon LOPS oil, 30 g of sorbitan monooleate, 0.2 g of 2,2'-azobis(isobutyronitrile). The resultant emulsion system is transferred to a suitable reaction vessel with stirring and is sparged with nitrogen. 2.7 g of a 10% solution of sodium metabisulfite is added continuously during the polymerization and the temperature of the emulsion increases to about 35-45° C. External heating is provided to maintain this temperature and agitation is maintained for 6-10 hours. The polymerization is completed at the end of that time resulting in a cationic polyacrylamide emulsion containing a polymer of about 37 percent acrylamide, about 53 percent cationic monomer, and about 10 percent of the polymerizable components of the azeotropic waste stream. The polymeric emulsion has a standard viscosity of 3.18 cp.

To produce a self-inverting emulsion product, 24 g of a breaker system composed of a 1.75:1 blend of the reaction product of nonylphenol with 6 moles of ethylene oxide and the reaction product of dinonylphenol with 24 moles of ethylene oxide is added.

EXAMPLE III

To evaluate the effectiveness of the emulsion polymer of Example II, as compared to an emulsion polymer prepared in identical manner except omitting the azeotropic waste stream, a conventional Buchner Funnel test is performed on aerobic sludge from the city of Columbus, Georgia, sewage treatment plant. The test is used to determine the relative effectiveness of various flocculants to dewater a sludge. It is performed by obtaining a representative sludge sample, dividing it into aliquots, adding the desired amount of the polymer being tested, conditioning the sludge by mixing the polymer solution in the sludge for 15 seconds at 450 rpm, pouring the conditioned sludge into a Buchner Funnel with moist filter paper, and then determining the drainage rate and amount of water removed.

When this is done with the polymer produced by Example II which contains the azeotropic waste stream, and for comparison purposes a conventional copolymer of acrylamide and a dimethylaminoethyl methacrylate methyl chloride quaternary (DMAEMA-MeCl) having the same standard viscosity, i.e. 3.18 cp. and a cationic:-nonionic monomer weight ratio of 53:47, the results are as shown in Table I. They demonstrate that the emulsion of the present invention is a somewhat more effective dewatering agent than the conventional polymer.

TABLE I

| | Filtrate Volume (ml) after Specified Time | |
|---|---|---|
| | Emulsion Sample | |
| Time (sec) | Invention | Comparative |
| 5 | 66 | 60 |
| 10 | 87 | 81 |
| 15 | 96 | 92 |
| 20 | 104 | 98 |
| 30 | 112 | 108 |
| 45 | 120 | 112 |

EXAMPLE IV

The basic procedures of Examples I, II and III are repeated to produce an azeotropic waste stream during the preparation of a cationic monomer, DMAEMA methyl chloride quaternary, to use that waste stream as a partial substitute for some of the acrylamide in a conventional 20% acrylamide/80% cationic polymer, and to evaluate its performance on sludge from the City of Columbus, Ga. The composition polymerized comprised 10% acrylamide, 80% DMAEMA methyl chloride quaternary, and 10% of an azeotropic waste stream containing about 16.7% methanol, 68.0% methyl methacrylate, 10.2% DMAEMA, 1.5% methacrylic acid, 2.0% dimethylaminoethanol, and 1.6% other.

The emulsion evaluated has a standard viscosity of 2.9 cp while a comparative emulsion of the same cationicity but prepared in the absence of the azeotropic waste stream has a standard viscosity of 3.0 cp. The performance of the two emulsions is essentially identical.

EXAMPLE V

The basic procedures of Examples I, II, and III are waste stream is not repeated except that the azeotropic removed during and after the transesterification reaction, rather it is simply carried along through the quaternization and thus is a portion of the cationic monomer weight which is added to the polymerization mixture. This composition is substantially equivalent to having removed the azeotrope before quaternization and then adding it back into the emulsion just prior to polymerization. The separated aqueous phase from insitu quaternizations contains about 55.4% of the DMAEMAMeCl-quaternary, 8% of the azeotropic composition, and 36.6% water. It is used to produce a polymer in emulsion form comprised of 13.5 % acrylamide, 79% cationic monomer, and 7.5% incorporatable components of the waste stream.

This emulsion is evaluated for performance on sludge from the City of Columbus, Ga. The polymer emulsion of the present invention has a viscosity of 3.2 cp while a comparative polymer emulsion prepared in the absence of the waste stream components has a viscosity of 3.35 cp. The performance of the polymer of the present invention is about 5% superior to that of the conventional polymer.

EXAMPLE VI

The basic procedure of Examples I, II, and III is repeated except that dimethyl sulfate is used to form the quaternary in lieu of the methyl chloride. Substantially similar polymerization and performance results as in Examples II and III occur.

EXAMPLE VII

The basic procedure of Example I is repeated on a larger scale to generate a standard composition containing a mixture of the cationic monomer and an azeotropic waste stream for incorporation into polymerizations. The composition contains 45% DMAEMAMeCl-quaternary, 14% water, and 41% of an azeotropic waste stream consisting of about 24.4% methanol, 57.5% methylmethacrylate, 12.2% dimethylaminoethyl methacrylate, 1.0% methacrylic acid, 2.4% dimethylaminoethanol, and 2.5% other.

The purpose of this example is to demonstrate polymerization reproducibility when utilizing the azeotropic waste stream.

In one case four polymerizations, as per Example II, at slightly varying pH's (4.00-4.95) are conducted. A sodium acetateacetic acid buffer is incorporated in two of the polymerizations to avoid any excessive coagulum formation and loss of cationicity. The results are:

| pH | Buffer | Viscosity (cp) | % Coagulum | % Cationicity Retained |
|---|---|---|---|---|
| 4.00 | No | 3.08 | 0.2 | 98 |

-continued

| pH | Buffer | Viscosity (cp) | % Coagulum | % Cationicity Retained |
|---|---|---|---|---|
| 4.50 | Yes | 3.04 | Trace | 100 |
| 4.75 | No | 3.18 | 0.5 | 98 |
| 4.95 | Yes | 3.15 | Trace | 100 |

In another case, the ethylenediaminetetraacetic acid is replaced by varying amounts of diethylenetriaminepentaacetic acid pentasodim salt (DTPA). The DTPA content is varied from 0.10 to 0.40% and the polymerization conducted as in Example II. The results are:

| DTPA (%) | Buffer | Viscosity (cp) | % Coagulum | % Cationicity Retained |
|---|---|---|---|---|
| 0.10 | Yes | 2.84 | Trace | 100 |
| 0.20 | No | 2.95 | 0.5 | 98 |
| 0.30 | No | 2.95 | 0.5 | 97 |
| 0.40 | Yes | 2.97 | Trace | 100 |

Each of these series clearly demonstrate the reproducibility of utilizing the azeotropic waste stream in the preparation of a cationic polymer.

EXAMPLE VIII

The basic procedure of Example I is repeated to produce different cationic monomers and different azeotropic waste streams depending upon the starting alcohol, starting acrylate, and distillation efficiency. The following different components are utilized:

| Starting Alcohol | Starting Acrylate |
|---|---|
| 1. dimethylaminoethanol | methyl acrylate |
| 2. dimethylaminoethanol | methyl acrylate |
| 3. dimethylaminoethanol | methyl methacrylate |
| 4. diethylaminoethanol | methyl acrylate |
| 5. diethylaminoethanol | methyl methacrylate |

In each case an azeotropic waste stream is produced which contains methanol, starting acrylate, unquaternized monomer, acrylic or methacrylic acid, starting alcohol, and a small amount of other material. Each of the waste streams is successfully incorporated into a polymerization in accordance with the procedure of Example II and high molecular weight flocculants are recovered in the form of water-in-oil emulsions.

EXAMPLE IX

A mixture of 336 g of a 50% solution of acrylamide in water, and 212 g of a 75% aqueous solution of dimethylaminoethyl methacrylate methylchloride quaternary, 91 g of an azeotropic waste stream resulting from preparation of the quaterary monomer (as prepared in Example I), is added to 136.0 g of diluent water containing 0.3 g of diethylenetriaminepentaacetic acid pentasodium salt, 1.5 g of isopropyl alcohol, 11.2 g of a 1% aqueous solution of potassium bromate and 0.5 g of azobisisobutyronitrile (AIBN). The solution is adjusted to pH 4.2 with concentrated sulfuric acid and buffered at pH 4.2 with 20 mls of standard sodium acetate/acetic acid buffer. The solution is cooled, while stirring, to approximately 10° C. If a slight haze persists a small amount of additional methanol is added, i.e. 0.5 to 5.0%, to enhance the solubilization of the azeotropic waste stream components.

The solution is then de-aerated by sparging with nitrogen gas for approximately 30 minutes. Polymerization is initiated by the addition of 20 mls of a 0.5% sodium bisulfite solution and the temperature is allowed to free rise to approximately 80° C. The gel is maintained at the maximum exotherm for a further 2 hours to ensure complete conversion. The polymer is then isolated by cutting up the gel into strips, drying at 60° C. and grinding to a fine powder. A polymer having a standard viscosity of 3.2 cp is obtained. When the product is isolated by cutting up the gel and slurrying/grinding in methanol to effect polymer precipitation, a polymer with a higher standard viscosity of 3.5 cp is obtained, which indicates that some fractionation has occurred during processing. Solution/gel polymerizations may utilize the azeotropic waste stream to produce effective cationic polymers.

What is claimed is:

1. In the preparation of a water-soluble cationic copolymer comprising (i) a nonionic monomer selected from acrylamide and methacrylamide and (ii) a cationic monomer of the formula

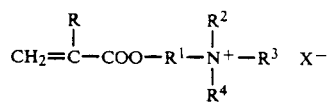

wherein R is hydrogen or methyl, $R^1$ is alkylene $C_2$-$C_4$, $R^2$-$R^4$ are each individually alkyl $C_1$-$C_4$, and X is a counterion, the improvement which comprises replacing a portion of the nonionic monomer with an azeotropic waste stream which is produced and removed during a transesterification reaction between a starting acrylate of the formula

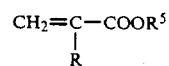

wherein $R^5$ is alkyl $C_1$-$C_3$, and a starting dialkylamino alcohol of the formula

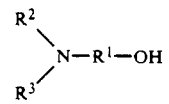

which was used to prepare the cationic monomer, wherein the waste stream is utilized in a totally different reaction from that in which it was produced.

2. The improvement of claim 1 wherein $R^1$ is alkyl $C_2$-$C_3$ and $R^2$-$R^4$ are individually $CH_3-$ or $CH_3CH_2-$.

3. The improvement of claim 1 wherein the cationic monomer is selected from the group consisting of quaternaries of dimethylaminoethyl acrylate, dimethylaminoethyl methacrylate, diethylaminoethyl methacrylate, and diethylaminoethyl acrylate.

4. The improvement of claim 1 wherein the waste stream comprises about 15 to about 35 weight percent $R^5OH$, about 35 to about 65 weight percent starting acrylate, about 3 to about 20 weight percent dialkylaminoalkyl acrylate, about 0.1 to about 10 weight percent of an acrylic acid, and about 0.5 to about 10 weight percent starting dialkylamino alcohol.

5. The improvement of claim 4 wherein the waste stream comprises about 20 to about 30 weight percent methanol, about 45 to about 60 weight percent of a starting acrylate selected from methyl acrylate and methyl methacrylate, about 8 to about 15 weight percent dialkylaminoalkyl acrylate, about 0.2 to about 5 weight percent of an acid selected from acrylic acid and methacrylic acid, and about 1 to about 3 weight percent starting dialkylamino alcohol.

6. The improvement of claim 4 wherein the waste stream further comprises about 0.1 to about 5 weight percent of other compounds which were present or were formed during the transesterification reaction selected from the group consisting essentially of volatile polymerization inhibitors/retarders, solvents, and side products derived from minor impurities originally present in the starting materials.

7. The improvement of claim 6 wherein the waste stream comprises about 1 to about 4 weight percent of the other compounds.

8. The improvement of claim 1 wherein the waste stream is produced during the preparation of a cationic monomer which is different from that being polymerized.

9. The improvement of claim 1 wherein the waste stream is produced during the preparation of a cationic monomer which is the same as that being polymerized.

10. The improvement of claim 3 wherein the quaternary is the methyl chloride quaternary.

11. The improvement of claim 3 wherein the quaternary is the methosulfate quaternary.

12. The improvement of claim 1 wherein the nonionic monomer is acrylamide.

13. The improvement of claim 1 wherein the copolymer is formed from monomers present in the aqueous phase of a water-in-oil emulsion.

14. The improvement of claim 13 wherein the water-in-oil emulsion is polymerized by a bi-phase initiator system which comprises either (i) an oil-soluble initiator and a water-soluble initiator, or (ii) an oil-soluble initiator and a water-soluble activator, or (iii) a water-soluble initiator and an oil-soluble activator.

15. The improvement of claim 13 wherein the preliminary monomer-containing water-in-oil emulsion is prepared with a high efficiency homogenizer.

16. A method of preparing an improved water-soluble cationic polymer of (i) a nonionic monomer selected from the group consisting of acrylamide and methacrylamide and (ii) a cationic monomer of the formula $$CH_2=C(R)-COO-R^1-N^+(R^2)(R^3)(R^4) \quad X^-$$

wherein R is hydrogen or methyl, $R^1$ is alkylene $C_2-C_4$, $R^2-R^4$ are each individually alkyl $C_1-C_4$, and X is a counterion, which comprises replacing a portion of the nonionic monomer by an azeotropic waste stream which is generated during the preparation of the cationic monomer by a transesterification reaction between an acrylate of the formula

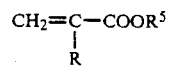

wherein $R^5$ is alkyl $C_1-C_3$, and a dialkylamino alcohol of the formula

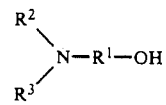

wherein the waste stream is utilized in a totally different reaction from that in which it was produced.

17. The method of claim 16 wherein $R^1$ is alkylene $C_2-C_3$ and $R^2-R^4$ are individually $CH_3$ or $CH_3CH_2$.

18. The method of claim 16 wherein the cationic monomer is selected from the group consisting of quaternaries of dimethylaminoethyl acrylate, dimethylaminoethyl methacrylate, diethylaminoethyl methacrylate, and diethylaminoethyl acrylate.

19. The method of claim 18 wherein the quaternary is the methyl chloride quaternary.

20. The method of claim 18 wherein the quaternary is the methosulfate quaternary.

21. The method of claim 16 wherein the waste stream comprises about 15 to about 35 weight percent $R^5OH$, about 35 to about 65 weight percent starting acrylate, about 3 to about 20 weight percent dialkylaminoalkyl acrylate, about 1 to about 15 weight percent of an acrylic acid, and about 0.5 to about 10 weight percent starting dialkylamino alcohol.

22. The method of claim 21 wherein the waste stream comprises about 20 to about 30 weight percent methanol, about 45 to about 60 weight percent of a starting acrylate selected from methyl acrylate and methyl methacrylate, about 8 to about 15 weight percent dialkylaminoalkyl acrylate, about 2 to about 8 weight percent of an acid selected from acrylic acid and methacrylic acid, and about 1 to about 3 weight percent starting dialkylamino alcohol.

23. The method of claim 21 wherein the waste stream further comprises about 0.1 to about 5 weight percent of other compounds which were present or formed during the transesterification reaction selected from the group consisting essentially of volatile polymerization inhibitors/retarders, solvents, and side products derived from minor impurities originally present in the starting materials.

24. The method of claim 23 wherein the waste stream comprises about 1 to about 4 weight percent of the other compounds.

25. The method of claim 16 wherein the waste stream is produced during the preparation of a cationic monomer which is different from that being polymerized.

26. The method of claim 16 wherein the waste stream is produced during the preparation of a cationic monomer which is the same as that being polymerized.

* * * * *